June 24, 1958
U. L. LAMBERT
2,839,772
COOKS' SPATULA CLEANER AND HOLDER
Filed June 6, 1955
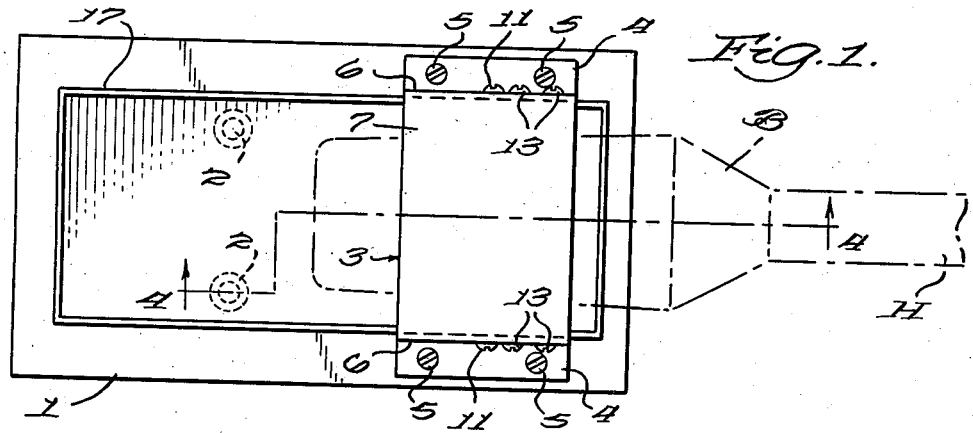
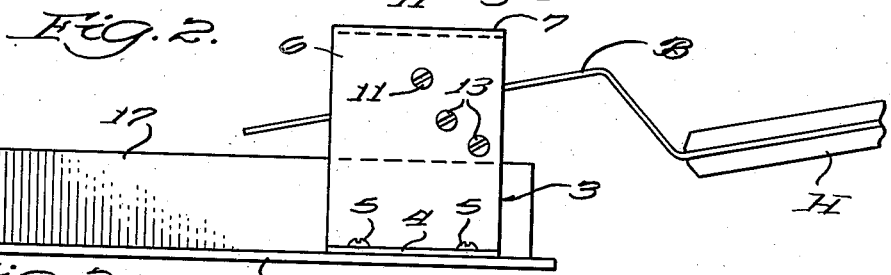
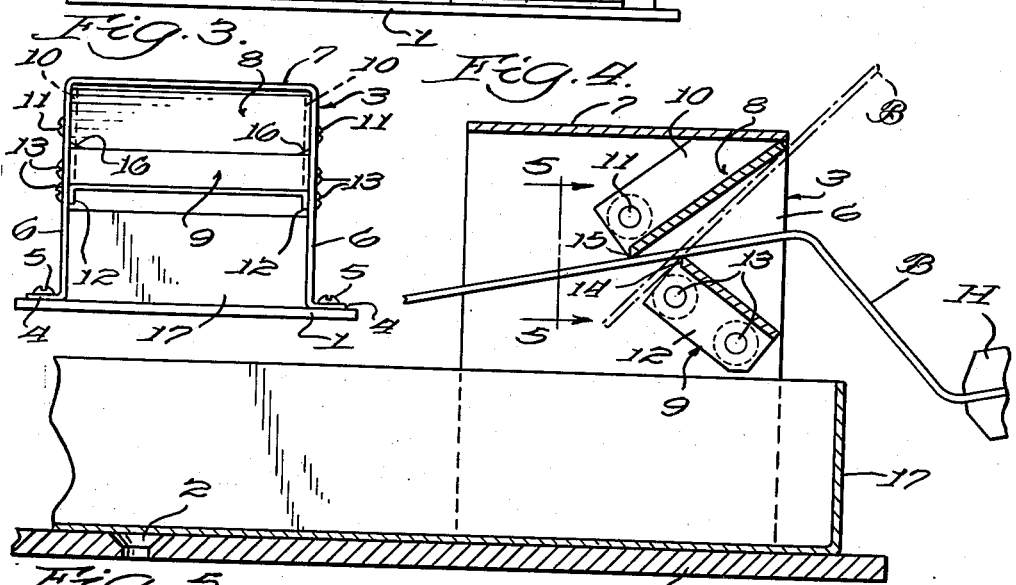
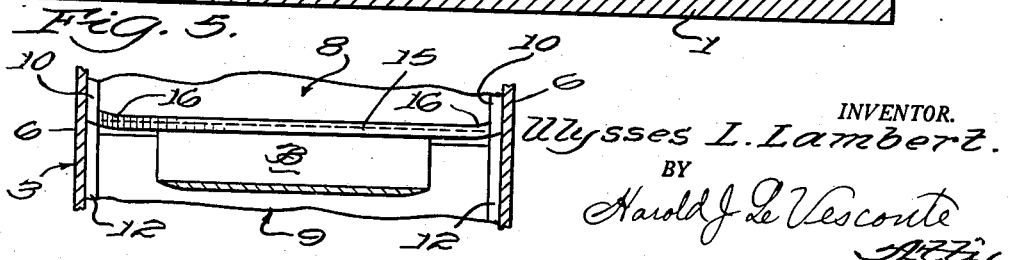
INVENTOR.
Ulysses L. Lambert.
BY
Harold J. LeVesconte
Atty.

United States Patent Office

2,839,772
Patented June 24, 1958

2,839,772

COOKS' SPATULA CLEANER AND HOLDER

Ulysses L. Lambert, Los Angeles, Calif.

Application June 6, 1955, Serial No. 513,232

6 Claims. (Cl. 15—236)

This invention relates to an improved means for cleaning spatulas used by restaurant cooks.

In the frying of beef and more particularly ground beef, the hot meat sticks to the spatulas used to turn the steak or hamburger and the quick cleaning of the spatula presents a problem that has heretofore caused a great deal of trouble, especially during rush periods. The cleaning requires a scraping action and often there is not sufficient time to stop and get a knife or other implement for that purpose. The present invention takes this problem into account and has for its principal object the provision of a device that can be mounted in a convenient place near the stove or hot plate and into which the blade of a spatula can be inserted and withdrawn with achievement of a scraping and cleaning action on the spatula blade.

Another object of the invention is to provide a spatula cleaner embodying the above objective which is constructed and arranged additionally to serve as a holder for the spatula when not in use.

A further object of the invention is to provide a spatula cleaning and holding device for use by cooks which is simple in construction, economical to manufacture, is readily cleaned and which is reliable in use.

With the foregoing objectives in view, together with such additional objectives and advantages as may subsequently appear, the invention resides in the parts, and in the construction combination and arrangement of parts described in the following specification of a presently preferred mode of execution of the invention; reference being had to the accompanying drawings which form a part of said specification and in which drawings:

Fig. 1 is a top plan view of a spatula cleaner and holder embodying the invention, Fig. 2 is a side elevation of Fig. 1.

Fig. 3 is an elevational view of the right hand end of Fig. 2.

Fig. 4 is an enlarged, fragmentary, sectional view taken on the line 4—4 of Fig. 1, and Fig. 5 is a further enlarged, fragmentary and elevational view taken of the area indicated by the arrowed lines 5, 5 in Fig. 4.

The illustrated embodiment of the invention comprises a base member 1 of rectangular shape in plan, preferably formed of heavy sheet metal provided with suitable means by which it may be fixed to the top of a table or other work surface at about table height such as screw receiving holes 2, 2. Bolted or otherwise fixed to the upper surface of the base 1 adjacent one end thereof is a scraper supporting member 3 which may be conveniently formed from a strip of metal bent into modified inverted U-shape and comprising oppositely outwardly laterally extending foot portions 4, 4 secured to the upper surface of the plate 1 by screws 5, vertically extending leg portions 6, 6 and a horizontally extending top portion 7. Secured to the inner faces of the leg portions 6, 6 and extending therebetween are upper and lower scraping members 8 and 9. The upper scraping member 8 is formed of a strip of hard metal having the ends thereof bent at right angles to the center portion with resultant formation of tabs 10, 10 which closely fit the inner faces of the leg portions 6, 6 and by which the scraping member is secured to the leg portions by suitable means such as screws 11, 11.

For convenience, the end of the device carrying the member 3 will be designated the front end. The upper scraping member is located in the upper portion of the member 3 and the center portion thereof is disposed to extend diagonally rearwardly and downwardly (see Fig. 4). The lower scraping member 9 is similarly formed with end tabs 12, 12 by which it is secured to the inner faces of the leg portions 6, 6 by screws 13; the body or mid-portion being disposed to extend diagonally upwardly and rearwardly terminating in a sharpened scraping edge 14 which is disposed forwardly of and slightly higher than the scraping edge 15 at the lower edge of the member 8 as best shown in Fig. 4. Some spatulas are formed with beveled side edges and to that end, the scraping edge 15 at each end thereof is formed with a slight upward slope 16. Loosely mounted on the base 1 and located between the leg portions 6, 6 and below the scraping members 8 and 9 is a pan 17 which extends from the front to the rear end of the base.

When it is desired to clean a spatula the blade B thereof is inserted in inverted position between the scraping members from the front end of the device. Then by bearing down on the handle H and drawing the spatula from the device, the top and bottom of the blade are brought into scraping contact with the edges of the scraping members 8 and 9 with resultant cleaning of the blade. Where the point or end of the blade requires additional cleaning, the spatula may be moved to the position shown in broken lines in Fig. 4 and drawn upwardly with resultant scraping of the upper surface of the blade at the distal end thereof; the relative positions of the upper and lower scraping edges being such as to effect the scraping of the lower surface of the inverted blade during the first described use of the device. When the spatula is not in use, it may be left in the device as shown in Figs. 2 and 4 in a position where it is always handy when next required. The pan 17 catches all grease drippings and matter scraped from the blade and is removed and emptied from time to time. It is particularly to be noted that the converging front faces of scraping members facilitates insertion of the spatula blade into the device.

Thus there has been provided a device which is effective for the cleaning of spatula blades and which additionally serves as a holding rack for the spatula when not in use. It is a more sanitary and more effective cleaning device than the wiping rags which currently are the most common instrumentality used for that purpose. Moreover, the design of the device is such as to permit it to be readily and completely cleaned.

While the foregoing specification discloses a presently preferred form of the invention, it is appreciated that in the light of the above disclosure, changes and modifications will suggest themselves to others skilled in the art. Accordingly, the invention is not to be deemed to be limited to the exact form thereof above disclosed by way of example, and it will be understood that the invention embraces all such changes and modifications in the parts and in the construction, combination and arrangement of parts as shall come within the purview of the appended claims.

I claim:

1. In a holding and cleaning device for cooks' spatulas, a horizontally disposed base having a front end and a rear end, and spatula holding and cleaning means mounted on said base and disposed at the front end thereof; said spatula holding and cleaning means comprising a pair of horizontally disposed, rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade.

2. In a holding and cleaning means for cooks' spatulas, a horizontally disposed base having a front end and a rear end, spatula holding and cleaning means mounted on the front end of said base and comprising a support attached to said base and including parallel leg portions extending vertically from opposite sides of said base, and spatula holding and cleaning elements carried by and extending between said leg portions comprising a pair of horizontally disposed, rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade.

3. In a holding and cleaning device for cooks' spatulas, a horizontal base having a front end and a rear end, a support of modified inverted U-shape mounted on the front end of said base and including spaced, parallel, vertically disposed leg portions having their lower ends attached to opposite side edges of said base and having an integrally formed member connecting the upper ends thereof, and spatula holding and cleaning means connected to and extending horizontally between said leg portions comprising a pair of rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade.

4. In a holding and cleaning device for cooks' spatulas, a horizontal base having a front end and a rear end, a support of modified inverted U-shape mounted on the front end of said base and including spaced, parallel, vertically disposed leg portions having their lower ends attached to opposite side edges of said base and having an integrally formed member connecting the upper ends thereof, and spatula holding and cleaning means connected to and extending horizontally between said leg portions comprising a pair of rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade; said member connecting the upper ends of said leg portions having a front edge extending parallel to said sharpened edge portions and effective to serve as a fulcrum for a spatula blade incident to cleaning the tip of the blade against the sharpened edge of said lower blade.

5. In a holding and cleaning device for cooks' spatulas, a horizontally disposed base having a front end and a rear end, and spatula holding and cleaning means mounted on said base and disposed at the front end thereof; said spatula holding and cleaning means comprising a pair of horizontally disposed, rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade; said sharpened upper edge of said lower blade at each end thereof being inclined upwardly to accommodate the tapered side edges of a spatula inserted between said blades.

6. In a holding and cleaning device for cooks' spatulas, a horizontally disposed base having a front end and a rear end, and spatula holding and cleaning means mounted on said base and disposed at the front end thereof; said spatula holding and cleaning means comprising a pair of horizontally disposed, rigidly mounted scraping blades including an upper blade sloping downwardly and rearwardly and terminating in a horizontally disposed sharpened lower edge and an upwardly and rearwardly extending lower blade terminating in a horizontally disposed sharpened upper edge extending parallel to said first named sharpened edge and disposed forwardly of and at a slightly higher elevation than said first named sharpened edge; the said relative positions of the edges of said blades allowing a spatula blade to be inserted between them from the front of the device and then to be drawn back while pressing downwardly on the handle with resultant imposition of a desired extent of scraping pressure on both sides of the spatula blade; the converging front faces of said blades serving to guide the end of a spatula blade between the sharpened edges of said blades.

References Cited in the file of this patent

UNITED STATES PATENTS

| | | |
|---|---|---|
| 199,976 | Heegaard | Feb. 5, 1878 |
| 2,707,299 | Steindorf | May 3, 1955 |
| 2,763,018 | White | Sept. 18, 1956 |